United States Patent [19]

Kurde

[11] Patent Number: 4,669,571
[45] Date of Patent: Jun. 2, 1987

[54] INDEPENDENT WHEEL SUSPENSION SYSTEM USING THRUST BEARING CONSTANT VELOCITY UNIVERSAL DRIVE JOINTS AS SUSPENSION MEMBERS IN COMBINATION WITH A SINGLE PROP SHAFT JOINT AND A TRANSVERSELY PIVOTABLE DIFFERENTIAL

[75] Inventor: Werner Kurde, Grosse Pointe Park, Mich.

[73] Assignee: GKN Automotive Components Inc., Auburn Hills, Mich.

[21] Appl. No.: 586,056

[22] Filed: Mar. 5, 1984

[51] Int. Cl.$^4$ .............................................. B60K 20/00
[52] U.S. Cl. ................................. 180/73.3; 180/73.5; 180/75
[58] Field of Search ................... 180/73.3, 73.4, 73.5, 180/73.1; 280/690, 700, 701

[56] References Cited

U.S. PATENT DOCUMENTS

| 2,140,876 | 12/1938 | Klavik | 180/73.3 |
| 2,911,052 | 11/1959 | Olley | 180/73.3 |
| 4,081,049 | 3/1978 | Youmans | 180/43 C |

FOREIGN PATENT DOCUMENTS

| 1920705 | 4/1969 | Fed. Rep. of Germany | 180/73.3 |
| 563128 | 8/1984 | United Kingdom | 280/700 |

Primary Examiner—Henry A. Bennet
Attorney, Agent, or Firm—Remy J. VanOphem

[57] ABSTRACT

An independent wheel suspension system having a transverse support tube rotatably supported by the side frame members of a vehicle frame to allow relative motion with respect thereto about a first transverse axis, a differential pivotably supported by the transverse tube to allow relative motion therebetween about a second transverse axis, a prop shaft coupled to the vehicle engine by only one universal joint, that joint being of the constant velocity plunging type, a torsion rod pivotably supported by the transverse tube so as to allow longitudinal twisting about a swing axis substantially parallel to the prop shaft axis, and a wheel assembly coupled by an inboard and outboard constant velocity joint to the differential and by a swing arm to the torsion rod, whereby the differential is adapted to move relative to the first transverse axis, the second transverse axis, and the swing axis.

10 Claims, 6 Drawing Figures

INDEPENDENT WHEEL SUSPENSION SYSTEM USING THRUST BEARING CONSTANT VELOCITY UNIVERSAL DRIVE JOINTS AS SUSPENSION MEMBERS IN COMBINATION WITH A SINGLE PROP SHAFT JOINT AND A TRANSVERSELY PIVOTABLE DIFFERENTIAL

BACKGROUND OF THE INVENTION

Cross-Reference to Related Applications

This patent application is related to the following copending applications assigned to the common assignee hereof:

U.S. Ser. No. 586,086, filed Mar. 5, 1984, entitled "Independent Wheel Suspension System Using Thrust Bearing Constant Velocity Universal Drive Joints As Suspension Members"; now U.S. Pat. No. 4,611,681;

U.S. Ser. No. 586,012, filed Mar. 5, 1984, entitled "Independent Wheel Suspension System Using Thrust Bearing Constant Velocity Universal Drive Joints, Bending and Torsional Motion Resistance Suspension Members And A Transversely Pivotable Differential";

U.S. Ser. No. 586,011, filed Mar. 5, 1984 entitled "Independent Wheel Suspension System Using Thrust Bearing Constant Velocity Universal Drive Joints As Suspension Members To Minimize Wheel Camber"now U.S. Pat. No. 4,632,203;

U.S. Ser. No. 586,022, filed Mar. 5, 1984 entitled "Independent Wheel Suspension System Using Constant Velocity Universal Joints In Combination With A Single Prop Shaft Joint And Mounted Differentials", now U.S. Pat. No. 4,596,299;

U.S. Ser. No. 586,098, filed Mar. 5, 1984 entitled "Independent Wheel Suspension Using Thrust Bearing Constant Velocity Universal Drive Joints As Suspension Members In Combination With A Wheel Assembly And Differential Coupled To Pivot About A Transverse Stabilizer", now U.S. Pat. No. 4,600,072; and U.S. Ser. No. 586,054, filed Mar. 5, 1984 entitled "Independent Wheel Suspension System Having A Differential Pivotable About Two Axes".

1. Field of the Invention

The present invention pertains to independent wheel suspension systems and more particularly, to independent wheel suspension systems wherein a constant velocity joint, as an indispensable component of the suspension system, is combined with a wheel motion resistance suspension assembly to provide a suspension system for a vehicle wherein the differential of the vehicle is pivotable about a first pivot axis established on the vehicle frame and a second pivot axis established on the suspension system.

2. Description of the Prior Art

The present invention has particular application to both front and rear wheel independent suspension systems wherein universal joints are used to transfer power from a power delivery unit, normally including an engine, transmission, and a differential housing, through half-shaft drive axles to the driving wheels. As a vehicle moves along a road surface, the wheels naturally experience an up and down movement relative to the driving surface. This movement is referred to as jounce and rebound, and the road clearance of various vehicle components vary accordingly. If the wheels are allowed to move in a plane approximately normal to the driving surface, such up and down movements have heretofore required corresponding changes in the swing length between the wheel and the differential of the power delivery unit. Such changes in swing length are normally effected by allowing an axial adjustment either of a driving member relative to the wheels or of one member of a driving member relative to another. Because of the dynamic loads associated with these up and down movements of the wheel and the geometric movements of the suspension members as a result of the various load and road conditions experienced by the wheels of a vehicle, past suspension system design efforts have been directed toward completely isolating the drive system components from the suspension system components to prevent the application of suspension loads to the power delivery unit or torque translating drive components of a vehicle. As a result of this approach, the structural design criteria of prior art vehicles is to limit the torque translating components of a vehicle to carry only torque loads to propel the vehicle and to design a separate suspension system to carry the loads associated with the up and down movement of the vehicle wheels as a result of load and/or road variations.

The foregoing jounce and rebound movements of the driving wheels relative to the road surface introduce lateral or axial thrust loads relative to the differential of the power delivery unit. The magnitude of such thrust loads is related to the transmitted torque and to road protuberances, cornering speeds, weight distribution, wheel camber, and load carried by the vehicle as well as other factors. Such axial thrust loads have been diverted from the torque translating driving joints by either suspension control members connecting the wheel assembly to other points on the chassis of the vehicle or by additional structure encasing either the torque translating half-shaft or driving joints.

Independent wheel suspension systems generally contemplate the use of two general types of universal driving joints: the Cardan-type joint and the constant velocity type joint. The Cardan-type joint consists of two yokes connected by a plain or rolling type bearing on the ends of a Cardan or cruciform-shaped cross. The cross consists of a block and two pins, one pin being smaller than the other and passing through it. Even though heat-treated alloy steels are used throughout, the small pin diameters limit the capacity of the joint to carry axial thrust loads because, such axial thrust loads normally impose stresses on the pins which are multiples of the stresses associated with carrying normal driving torque. Moreover, the stresses deleteriously augment each other, through vector addition. The major deterrent to using a single Cardan-type joint in an independent rear suspension system, however, is the severe limitation on the allowable angle of articulation under high torque loads. This is because the velocity ratio of the speed of the driving to the driven shaft pulsates or "knuckles" with increasing amplitudes as the angular articulation between these shafts increases. The cyclic speed pulsations significantly increase as articulation between the driving and driven joint members increase. Such speed pulsations cause correspondingly higher dynamic stresses on the Cardan cross pins and corresponding vehicle vibration and noise as loads of any appreciable inertia are translated through the joint. The higher dynamic stresses wear the joint structure to degeneratively further increase the speed variations and further limit the ability of the Cardan joint to carry high torque loads. Moreover, under thrust loads, the normal manufacturing tolerance of a Hooke's joint or Cardan joint, by themselves, cause unacceptable vibrations.

To avoid the foregoing deleterious stress and load carrying consequences of Cardan-type universal joints, their use in vehicles is generally limited to applications where the normal angular articulation between the driving and driven members is substantially less than ten degrees, usually less than three degrees. Even then, as herein above set forth, other structure is provided to divert the axial thrust loads away from the Cardan-type universal joints. For example, British Pat. No. 765,659 discloses the use of a Cardan-type universal joint to carry just the driving torque. A spherical socket and a mating ball-shaped member are provided about the Cardan joint to divert the axial thrust loads away therefrom. The patent to Etnyre, U.S. Pat. No. 3,112,809 discloses the use of Cardantype universal joints to couple the inboard and outboard ends of a live axle. Lateral forces on the wheel are disclosed as being resisted by the live axle and also by a cantilever leaf spring. The Cardan type universal joints are disclosed as being capable of absorbing axial loads well in excess of those encountered under normal conditions, but such conditions are limited to use of the joints only as a drive member and not as a suspension member.

Being limited in their allowable articulation and not being able to carry axial thrust loads normally associated with an operating vehicle, Cardan-type universal joints are not used as a suspension member, thereby requiring other pivot points displaced outboard from such Cardan type joint and additional suspension control members connected to such other pivot points to carry the axial thrust loads.

Constant velocity universal joints have heretofore been used with independent wheel suspension systems to avoid the debilitating effects of the foregoing cyclic speed variations of Cardan-type joints while permitting substantially greater articulation angles of the wheel with respect to the drive shaft or the drive shaft with respect to the differential of the power delivery unit. Constant velocity universal joints of the type that provide uniform velocity between the driving and driven members at any intersecting angle of the joint are shown in U.S. Pat. Nos. 2,046,584 to Rzeppa, U.S. Pat. No. 3,162,026 to Ritsema, and also commonly assigned U.S. Pat. Nos. 3,688,521, 3,928,985, 4,240,680 and 4,231,233, the specifications of which are hereby incorporated by reference. However, such known constant velocity universal joints have heretofore been used to carry just the driving torque transmitted through the spherical ball members of the joint. These balls ride in sets of opposing axial grooves formed on a partially-spherical inner joint member and on a partially-spherical outer joint member. A ball guide cage is positioned to capture and guide the balls through a homokinetic plane of rotation wherein the centers of the balls very nearly bisect the articulation angle between the driving and driven shafts resulting in a constant velocity transmission of rotary motion. The ball cage normally consists of upper and lower partially-spherical surfaces guided, respectively, on the partially-spherical inner and outer surfaces of the joint members, but are designed to have radial clearances therebetween in order to insure lubrication of the surfaces and thereby avoid excessive heat build up.

As explained more fully in the aforesaid U.S. Pat. No. 3,928,985, issued Dec. 30, 1975, when the connecting drive shafts transmit torque loads at an articulated angle, internally generated joint friction and joint geometry of such constant velocity universal joints cause the inner and outer joint members to shift with respect to each other to take up the aforementioned clearances. Balls in diametrically opposite sets of grooves are thrust in opposite directions, causing the cage to be somewhat tilted or skewed relative to the design. The forward and aft end portions of the upper and lower partially-spherical surfaces of the cage are tilted or skewed under torque transmitting loads and bear radially against the inner and outer spherical joint members. Such skewed contact between the inner and outer spherical surfaces of the cage with the respective inner and outer joint members is tolerated to avoid the undesirable friction effects of greater surface contacts with smaller clearances. The internally generated loads, as a result of torque transmission through the joint, have been observed to decrease from about a maximum of three hundred pounds per wheel, which occurs when maximum torque is transmitted at extreme articulation angles of the drive joints just before a vehicle begins to move.

In any event, the balls and axial grooves of the constant velocity universal joint have heretofore been used to translate the driving torque while the spherical portions of the inner and outer joint members experience the internally generated loads, such internally generated loads being carried either by direct contact between the inner and outer joint members or through the interposed spherical surfaces of the cage. As taught in U.S. Pat. No. 3,789,626, to Girguis, where one constant velocity universal joint was used as a fixed joint, as in the drive shaft of a rear drive motor vehicle, an object of such an application is to maintain the joint elements free of axial internal forces, even though the joint was constructed to absorb forces, at least those related to torque translation. In fact, the joint was designed to avoid transmitting axial forces through the control element. Therefore, when used at opposite ends of a driving half-shaft, one of such constant velocity universal joints has heretofore been of the axial slip or plunging variety, allowing axial movement of the driven joint with respect to the driving joint, and the constant velocity universal joint at the other end has been of the non-axial slip or fixed type not permitting such axial movement.

In any event, such constant velocity joints and the drive shaft that couple them have heretofore not been used to transmit anything more than torque loads, and the related internally generated axial loads. For example, U.S. Pat. No. 3,709,314, to Hickey, discloses the use of a Rzeppa or Bendix-Weiss type of constant velocity joint at both ends of each of two front-wheel drive shafts, and a Rzeppa-type constant velocity joint is disclosed at both ends of each of two rear-wheel drive shafts. Hickey further discloses four suspension units of the type conventionally used to divert externally generated axial thrust loads away from the constant velocity universal joints. The suspension units are substantially similar, except for variations in torsion bar, shock absorber, and linkage attachment points due to the location of the units, front to rear and side to side. Each typical suspension unit is disclosed as consisting of a conventional upper A-frame arm and lower A-frame arm. These are connected to tubular frame members by means of multiple brackets permitting vertical swinging motion. The wishbone ends of the A-frame arms are shown pivotably connected forward and aft of the center of each wheel, and in no instance is any drive shaft shown or disclosed as being any part of the suspension system or being a part of a typical suspension unit.

Vehicle differentials have heretofore been mounted to the vehicle frame so that a differential input axis is not necessarily coaxial relative to the output axis of the engine and is subject to movement therebetween during normal vehicle operation. To accommodate this non-coaxial alignment and movement, the engine output is normally coupled to the differential input through a pair of universal joints coupled by a prop shaft. One universal joint couples the driving torque from the engine output to the prop shaft through an engine-to-prop shaft articulation angle therebetween, while the other universal coupling couples the driving torque from the output end of the prop shaft to the differential input through a prop shaft-to-differential articulation therebetween. Each such universal joint increases the weight of the vehicle by both the weight of the joint and the additional structure required at either the engine or the differential for mounting the joint. Moreover, each such universal joint represents a separate concern during assembly of the vehicle and subsequent maintenance thereof. U.S. Pat. No. 3,625,300 to Barenyi, et al., discloses the suspension of an axle unit of a motor vehicle by a support member permitting pivoting of the wheel pair in relation to the vehicle superstructure about two mutually perpendicular essentially horizontal axes, but without allowing any relative movement about either axis between the wheels and the axle gear housing.

SUMMARY OF THE PRESENT INVENTION

The present invention recognizes and utilizes the fact that, once a conventional constant velocity universal joint is used as an axial thrust bearing suspension member of an at least two part independent wheel suspension system, the second part may be coupled to the vehicle frame in a manner affording new and improved concepts of supporting the vehicle differential so as to reduce overall cost, weight, and complexity.

The present invention further recognizes the fact that, once a constant velocity universal joint is used as a thrust bearing suspension member of a vehicle suspension system, the differential may be allowed to pivot in a manner eliminating the function of at least one of the universal joints used by a vehicle prop shaft to couple the driving torque from the vehicle engine to the input of the differential.

The present invention further recognizes that, the use of a thrust bearing constant velocity universal joint, as an independent suspension member simplifies and eliminates constraints on the positioning of the differential relative to the engine output axis, and the differential may be supported to effect further simplifications and cost reductions.

According to the present invention, a transverse support tube is mounted on the vehicle frame so as to be pivotable about a first transverse axis. The support tube includes a rearwardly extending differential support yoke, one end of which is attached to the transverse support tube and the other end of which is attached to the differential along a second transverse axis therethrough, parallel to the first transverse axis and spaced therefrom by a differential mounting space. The differential is supported by the transverse support yoke in a manner such that the second transverse axis may be coaxial with the differential output axis and the differential is pivotable thereabout.

The input to the differential is coupled to the engine output by two couplings attached to opposite ends of a prop shaft. The first coupling may be an axially fixed constant velocity universal joint or Cardan-type universal joint coupling the engine output to the prop shaft through an engine-to-prop shaft articulation angle between the engine output axis and the prop shaft axis. If an axially fixed constant velocity or Cardan-type universal joint is used at the engine output to the prop shaft the other prop shaft coupling is a splined coupling that couples the other end of the prop shaft to the differential input in a manner causing the prop shaft axis to be coaxial with the differential input axis.

In the case where a constant velocity universal joint of the axial plunge type is used at the engine output to the prop shaft, the other end of the prop shaft may be attached directly to the differential as, by way of example, two flanges bolted together. A constant velocity universal joint couples the differential output to the wheel assembly through a half-shaft assembly in a manner such that the engine driving torque is translated to the wheels of the vehicle and the half-shaft assembly serves as an indispensable component of the vehicle suspension system by providing one pivot point of a two pivot point suspension system defining a swing axis thereabout, the swing axis being perpendicular to the first transverse axis, the second transverse axis, and the differential output axis.

The transverse support tube also carries a torsion rod at the second pivot point defining the swing axis. The torsion rod has an engine end suitably affixed to the frame so as to restrain peripheral and bending motion about a transverse tube end of the torsion rod. A swing arm couples the wheel assembly to the transverse tube end of the torsion rod and cooperates therewith to resist motion about the swing axis between the differential and the wheel assembly. The torsion rod has a longitudinal bending stiffness sufficient to resist relative motion about the first transverse axis between the vehicle frame and either the wheel assembly or the differential. As the differential moves relative to the vehicle frame about the first transverse axis, the differential also pivots about the second transverse axis by an amount which is a function of the engine-to-prop shaft articulation.

The invention contemplates an embodiment wherein a universal joint is used at the engine prop shaft end to couple the prop shaft to the engine and a spline joint at the differential prop shaft end to couple the prop shaft to the differential. The universal joint at the engine prop shaft end may be replaced with an axially plunging constant velocity universal joint to eliminate the use of any joint between the differential and the prop shaft. The prop shaft is, in this case, bolted directly to the differential.

It is, therefore a primary object of the present invention to provide a new and improved independent wheel suspension system.

It is another primary object of the present invention to provide a new and improved vehicle independent wheel suspension system utilizing only one universal joint to couple the differential to the engine.

It is a further object of the present invention to provide an independent wheel suspension system of the foregoing type, wherein the differential is coupled to the wheel assembly by a constant velocity universal joint establishing one of two pivot or bearing points of a swing axis permitting relative motion between the differential and the wheel assembly.

It is a primary object of the present invention to provide an independent wheel suspension system having a differential pivotable about more than one axis.

It is a further object of the present invention to provide an independent wheel suspension system of the foregoing type, wherein the differential is supported relative to the vehicle by a transverse support tube pivotable relative to the vehicle about a first transverse axis.

It is a further object of the present invention to provide an independent wheel suspension system of the foregoing type, wherein the transverse support tube includes differential mounting means for mounting the differential so as to be pivotable about a second transverse axis spaced from the first transverse axis.

It is a further object of the present invention to provide an independent wheel suspension system of the foregoing type, wherein the transverse support tube carries the end of a torsion rod at the second pivot point defining the swing axis and wherein the wheel assembly is connected to the end of the torsion rod by a swing arm cooperating with the torsion rod to resist relative movement about the swing axis between the differential and the wheel assembly.

It is a further object of the present invention to provide an independent wheel suspension system of the foregoing type, wherein the differential has a differential input connected to the engine output by two couplings connected by a prop shaft, one of the couplings being a universal joint cooperating with a spline coupling at the differential for movement of the differential about the second transverse axis.

It is a further object of the present invention to provide an independent wheel suspension system of the foregoing type, wherein the differential has a differential input connected to the engine output by a prop shaft having a constant velocity universal joint at one end thereof with the other end of the prop shaft being connected to the differential by a bolt connection.

BRIEF DESCRIPTION OF THE DRAWINGS

These and other features of the present invention will become more apparent to those skilled in the art from the following detailed description of a preferred embodiment taken in conjunction with the appended drawings wherein.

DETAILED DESCRIPTION OF THE PREFERRED EMBODIMENT

Referring now to the drawings, there is shown in FIGS. 1 through 6 a four-wheeled motor vehicle which includes a body 5 mounted to a chassis 10. The chassis 10 is supported in a known manner, such as by springs or shock absorbers (not shown), with respect to a chassis support means in the form of a vehicle frame 12 consisting of a first longitudinal frame member 14 and a second longitudinal frame member 16, and at least one transverse support member spaced therebetween and suitably affixed thereto. Chassis and/or chassis support means, as used herein, are intended to include a vehicle made of unitary construction wherein some of the chassis components are provided in the body of the vehicle.

Figure 2:
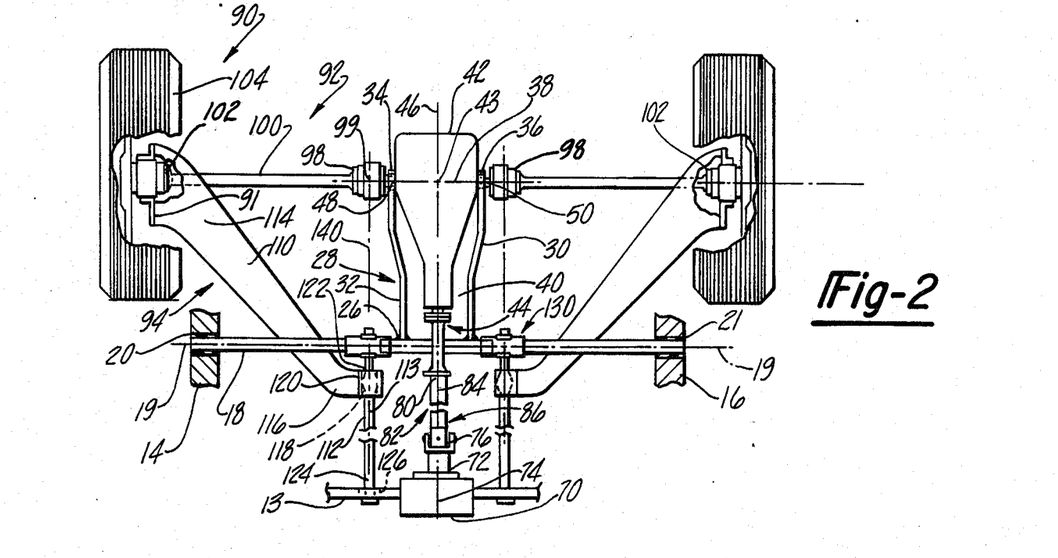
FIG. 2 is a plan view, partially in cross-section, of the independent wheel suspension system of FIG. 1.
Figure 5:
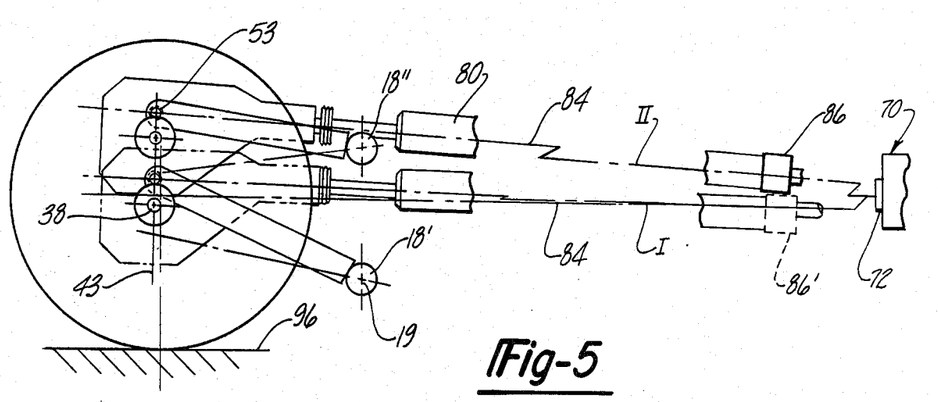
FIG. 5 is a diagrammatic side view of the independent wheel suspension system of the present invention positioned in a fully loaded and a totally unloaded condition.

The transverse support member is shown in the form of a transverse tube 18, as shown in FIG. 2, the outboard ends of which are rotatably supported by bushings 20 and 21 carried by the first and second longitudinal frame members, 14 and 16 respectively, so as to permit a rotatable motion about a transverse axis 19 coaxial with the axis of the transverse tube 18. Extending rearwardly from the transverse tube 18, and suitably affixed thereto, such as by welds 26, is a differential mounting means in the form of a yoke member 28 having two spaced-apart yoke arms 30 and 32, each including a journal surface 36 and 34, respectively, that is coaxial with a second transverse axis, such as the differential output axis 38 or any suitable axis 53, as shown in FIG. 5, substantially parallel to the first transverse axis 19 and spaced therefrom by a rearwardly extending differential mounting space 40, as shown in FIG. 2.

Positioned partially in the differential mounting space 40 is a vehicle differential 42. The vehicle differential 42 has a differential input 44 that is coaxial about a differential input axis or prop shaft axis 46, and it has a pair of laterally-opposed differential outputs 48 and 50 that are coaxial about the differential output axis 38. Each differential output 48 and 50 includes an annular trunnion portion, not shown, supported by a respective resilient bushing, not shown, suitably captured by and retained in the journal surfaces, 34 and 36, as by a pair of trunnion caps, not shown, securing each respective trunnion portion to the yoke arm 30 and 32, respectively. The differential 42 is mounted in the journal surfaces 34 and 36 so that the differential output axis 38 of the differential is coaxial with the second transverse axis so as to be pivotable thereabout, as shown in FIG. 2, when the yoke is mounted coaxial with the differential output axis. As set forth above, any suitable axis 53, as shown in FIG. 5, may be established to pivot the differential about its differential output axis 38.

The vehicle also includes an engine 70 having an engine output 72 adapted to provide driving torque about an engine output axis 74. The engine output 72 is connected to the differential input 44 by a prop shaft 82 having an engine coupling in the form of a universal joint 76 and a differential coupling in the form of a splined shaft end 80, the universal joint 76 and the splined shaft end 80 being fixed at opposite ends of the prop shaft 82, which has a prop shaft axis 84 coaxial therewith. The universal joint 76 may be of the Hooke's type or of the constant velocity type permitting articulation between the engine output axis 74 and the prop shaft axis 84. The splined shaft end 80 of the prop shaft 82 causes the prop shaft axis 84 and the differential input axis 46 to be coaxial while permitting axial swing movement of the prop shaft 82 relative to the engine. The prop shaft 82 operates in a known manner to translate the driving torque provided by the engine 70 about the engine output axis 74 to the differential input 44, and the differential 42 redirects such driving torque to its laterally opposed differential outputs 48 and 50 about the differential output axis 38.

Figure 6:
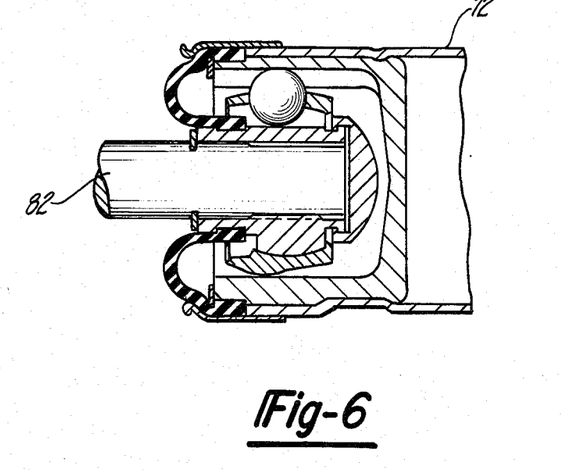
FIG. 6 is an elevational view, partially in cross-section, of an axially plunging type constant velocity universal joint usable to couple the differential and engine and for certain other applications of the present invention.

In the alternative, a plunging type constant velocity universal joint may be used as the engine coupling while the differential coupling used therewith may be a bolted flange, coupling the differential 42 directly to the prop shaft 82 and permitting neither axial sliding movement nor articulation between the differential 42 and the splined shaft end 80 attached to the differential 42. The plunging type constant velocity universal joint coupling the engine 70 to the prop shaft 82, therefore, provides the functions of axial sliding movement as well as articulation between the engine 70 and the prop shaft 82. The plunging type constant velocity universal joint is more fully set forth in copending patent application Ser. No. 586,086, the specification of which is incorporated herein by reference. A plunging type constant velocity universal joint as shown in FIG. 6 illustrates the above embodiment. The prop shaft 82 is attached to the inner member while the engine output shaft 72 is attached to the outer member such that axial movement as well as articulation of the prop shaft with respect to the engine output is accomplished.

To accommodate any engine-to-prop shaft articulation between the engine output axis 74 and the prop shaft axis 84 in the vertical plane, the differential 42 pivots about the differential output axis 38 by the action of the differential trunnion portions on their respective resilient bushings relative to the journal surfaces 34 and 36. To accommodate any engine-to-prop shaft articulation between the engine output axis 74 and the prop shaft axis 84 in the horizontal plane, the differential 42 yaws about the vertical differential axis 43 as the differential trunnion portions twist end for end in their resilient bushings relative to the journal surfaces 34 and 36. Those skilled in the art will readily recognize that such yawing and pivoting of the differential can be effected by other suitable equivalents.

The vehicle further includes an independent wheel suspension system for each driving wheel assembly 90. Each such independent wheel suspension system consists of at least a first suspension part 92 and a second suspension part 94 for independently suspending each driving wheel assembly 90 with respect to a driving surface 96 through a respective wheel assembly. Each such first suspension part 92 has an inboard constant velocity universal joint 98 coupled by a half shaft or drive shaft 100 to an outboard constant velocity universal joint 102. The inboard constant velocity universal joints 98 are mounted to the lateral sides of the differential outputs 48 and 50, respectively, and each outboard constant velocity universal joint 102 is mounted to a wheel assembly 90 for rotatably driving the driving wheel 104 of such wheel assembly 90 about a wheel axis, as shown in greater detail in U.S. Pat. No. 4,231,233, issued Nov. 4, 1980, the specification of which is hereby incorporated herein by reference.

Figure 4:
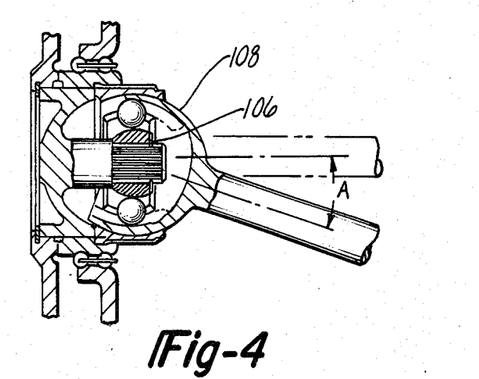
FIG. 4 is an elevational view, partially in cross-section, of one type of a fixed constant velocity universal joint carrying both driving torque and axial thrust loads in accordance with the present invention.

Each of the inboard and outboard constant velocity universal joints 98 and 102 is preferably of the fixed, or non-axial movement type, as shown in greater detail in FIG. 4, and includes an inner joint member 106 and an outer joint member 108 coupling respective shafts having therebetween an angular intersection A, also known as the articulation angle. The articulation of the assembly is normally on the order of three to six degrees when the vehicle is at rest, but under full load of the vehicle, as well as conditions of wheel jounce and rebound, may be on the order of ten to fifteen degrees or more.

In certain applications, one or both of the inboard and outboard constant velocity universal joints 98 and 102 may also be of the axially plunging type, shown in FIG. 6, or of the telescoping or splined types, such as those shown in U.S. Pat. No. 3,688,521, to Smith, et al., issued Sept. 5, 1972, the specification of which is hereby incorporated herein by reference, as long as the universal joints of any such type, at either end of their axial travel, function as a suspension part of the independent wheel suspension system in the same manner as a fixed constant velocity universal joint. Moreover, some applications may require that only the inboard joint be of the constant velocity universal type, the outboard coupling being of another type, universal or otherwise.

Figure 3:
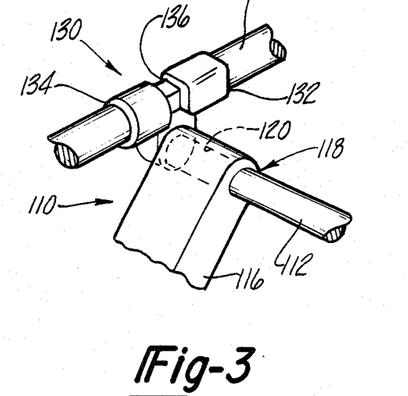
FIG. 3 is an isometric view at an enlarged scale, and partially in cross-section, of the bushing coupling for the transverse support tube, the torsion rod, and the swing arm provided in accordance with the present invention.

Each second suspension part 94 includes a wheel motion resistance assembly in the form of a swing arm 110, and a torsion rod 112 cooperating with the transverse tube 18. Each swing arm 110 has a wheel end 114 and a torsion rod end 116. The wheel end 114 is pivotably connected to the wheel assembly 90 such as by a pivot knuckle 91, and the torsion rod end 116 has an axial length section 118 with a hexagonally-shaped socket 120 therein for capturing a hexagonally-shaped end of the torsion rod 112. The other end 124 of the torsion rod 112 is suitably captured and secured both axially and circumferentially to a forward frame end 13 of the vehicle frame 12 in a suitable known manner, such as by another hexagonally-shaped socket and bolt arrangement 126. As best seen in FIG. 3, each torsion rod 112 is pivotally journalled in an annular rod bushing 130 suitably affixed to the transverse tube 18, such as by mounting flanges 132 and 134 having flats 136 to prevent circumferential slippage.

The first and second suspension parts 92 and 94 swing, or pivot, about a swing axis 140 developed by the longitudinal axis 113 of the torsion rod 112 being aligned with the homokinetic center 99 of the inboard constant velocity universal joint 98. Accordingly, the torsion rod 112 rotates with respect to the rod bushing 130 as the swing arm pivots about the swing axis 140. The first and second suspension parts 92 and 94 also pivot about the transverse axis 19. However, the tendency to pivot about each of these axes is resisted and dampened by the foregoing wheel motion resistance assembly. The swing axis 140 allows relative motion thereabout between the differential 42 and the wheel assembly 90 through the action of the swing arm 110. However, such motion is resisted by the torsional, or circumferential stiffness of the torsion rod 112 as coupled from the hexagonally-shaped end 122 thereof to the wheel assembly 90 through the swing arm 110. As will be apparent to those skilled in the art, the torsional stiffness of the torsion rod 112 can be selected to accommodate and balance other known suspension considerations.

Each torsion rod 112 has a predetermined longitudinal, or bending, stiffness selected to accommodate other suspension considerations. Such longitudinal bending stiffness is coupled to the transverse tube 18 through the rod bushing 130 for the purpose of resisting movement about the transverse axis 19 between the vehicle frame 12 and either or both the differential 42 and the wheel assembly 90. As will be apparent to those skilled in the art, equivalent means providing the same function of resisting such bending motion may be provided. For example, a coiled spring may be mounted between each wheel assembly 90 and the chassis 10 or levelling means, hydraulic or otherwise, may be applied to either the wheel assembly 90 or the differential 42. Moreover, as will also be apparent to those skilled in the art, the motion resistance means may also include various combinations of helical springs, leaf springs, shock absorbers and other known suspension devices.

OPERATION

The operation of the independent wheel suspension system of the present invention may be better understood with reference to the two drive line positions shown in FIG. 5. Therein, position I represents the fully-loaded condition wherein the vehicle is loaded with the equivalent of five passengers in the passenger compartment and appropriate weights of three hundred pounds in the trunk. Position II represents the standard unloaded condition in which the vehicle frame is raised from the ground until the wheels just lift off or freewheel. The independent wheel suspension system is designed so that all other normal conditions, including jounce, rebound and cornering, effect positions intermediate positions I and II.

Figure 1:
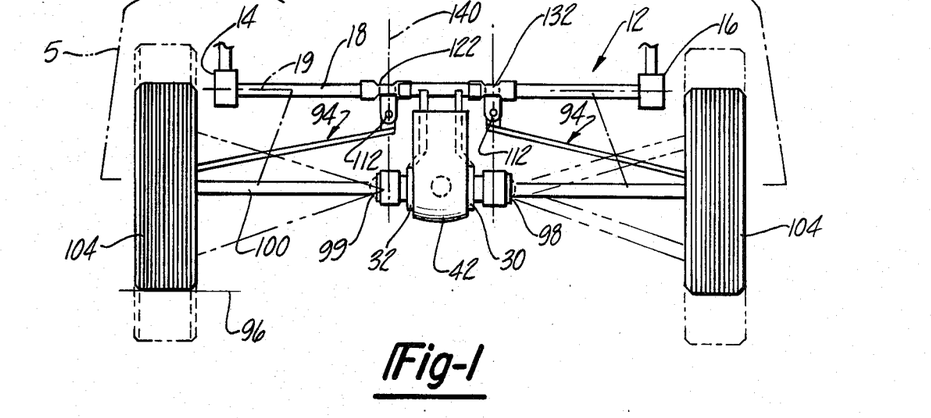
FIG. 1 is an elevational schematic view, of an independent wheel suspension system provided in accordance with the present invention.

In obtaining the fully loaded position I, the vehicle frame 12 and the transverse tube 18 are moved downwardly toward the road surface 96, into the plane of the paper as viewed in FIG. 2, or downwardly in a direction toward the road surface 96 as illustrated in FIGS. 1 and 5. Assuming there is no jounce or rebound of a driving wheel 104 relative to the driving surface 96, each driving wheel 104 tends to swing upward relative to the vehicle frame 12 about both the transverse axis 19 and the swing axis 140. But, this motion is resisted and dampened by the torsion rod 112 through the swing arm 110. The upward movement about the swing axis 140 is resisted by the torsional stiffness of each torsion rod 112 and the upward movement about the transverse axis 19 is resisted by the longitudinal bending stiffness of each torsion rod 112.

Because the yoke members 28 and 30 are pivotable about either the transverse axis 19 or a parallel axis 53 illustrated in FIG. 5, as well as about the differential output axis 38, the transverse tube 18 moves downward relative to the driving surface 96. To accommodate the slight forward movement of the differential input 44 relative to the engine output 72 as the yoke members 28 and 30 move downward, the engine end 86 of the prop shaft 82 plunges forward by a slight amount 86' in the constant velocity joint 76.

Although the best mode contemplated by the Applicant for carrying out the present invention as of the filing date hereof has been shown and described herein, it will be apparent to those skilled in the art that suitable modifications and variations may be made thereto without departing from what is regarded as the scope of the invention, which invention is to be limited only by the terms of the following claims.

What is claimed is:

1. An independent wheel suspension system for a wheel assembly of a vehicle having an engine adapted to provide a driving torque, a prop shaft having a porp shaft axis and a first prop shaft end coupled to said engine by a universal joint adapted to permit said first prop shaft end to undergo an engine-to-prop shaft articulation relative to said engine while coupling said driving torque to a second prop shaft end, a chassis, and vehicle support means adapted to resiliently support said chassis while also having a variable displacement relative to a driving surface, said independent wheel suspension system comprising:

transverse support means supported by said vehicle support means so as to be pivotable about a first transverse axis, said transverse support means defining a second transverse axis parallel to said first transverse axis and spaced therefrom by a differential mounting space, said transverse support means having differential support means extending between said first and said second transverse axes;

differential means supported by said differential support means in said differential mounting space so as to be pivotable about said second transverse axis, said differential means having a differential input defing a differential input axis and adapted to be coupled to said second prop shaft end with said differential input axis substantially coaxial with said prop shaft axis so as to avoid a prop shaft-to-differential articulation therebetween, said differential means also having a differential output with a differential output axis substantially coaxial with said second transverse axis, said differential output adapted to redirect said driving torque coupled to said differential input by said second prop shaft end along said differential output axis;

a constant velocity universal joint coupled to said differential output and to said wheel assembly and adapted to couple therebetween both said driving torque and lateral thrust loads, said constant velocity universal joint serving as one bearing point of a first and a second bearing point defining a swing axis therebetween substantially perpendicular to one axis of said first transverse axis, said second transverse axis, and said differential output axis;

pivot means carried by said transverse support means at the other bearing point defining said swing axis so as to be pivotable about said swing axis through said constant velocity universal joint; and arm means coupling said wheel assembly and said pivot means for allowing said differential means to pivot relative to said one axis;

whereby, as said vehicle support means undergoes said variable displacement, said differential means pivot about said second transverse axis while said first prop shaft end undergoes said engine-to-prop shaft articulation to thereby avoid said prop shaft-to-differential articulation.

2. The independent wheel suspension system of claim 1, wherein said pivot means comprises torsion rod means for resisting movement about said swing axis.

3. The independent wheel suspension system of claim 1, wherein said pivot means comprises longitudinal motion resistance means for resisting movement about said one axis.

4. The independent wheel suspension system of claim 1, wherein said differential means are allowed to pivot about said one axis and a second axis of said first transverse axis, said second axis, said differential output axis, and said swing axis.

5. The independent wheel suspension system of claim 4, wherein said differential means are allowed to pivot about a third of said axes.

6. An independent wheel suspension system for a wheel assembly of a vehicle having vehicle support means for supporting a vehicle chassis comprising:

transverse support means supported by said vehicle means support so as to be pivotable about a transverse axis;

power delivery means connected to said transverse support means and having an output axis and an inboard constant velocity universal joint adapted to carry lateral thrust loads along said output axis;

pivot means carried by said transverse support means so as to be pivotable about a longitudinally extending swing axis through said inboard constant velocity universal joint substantially perpendicular to said transverse axis and said output axis; and arm means coupling said wheel assembly and said pivot means for allowing said power delivery means to pivot relative to at least two axes of said output axis, said transverse axis, and said swing axis.

7. The independent wheel suspension system of Claim 6, wherein said power delivery means is allowed to pivot relative to the other axis of said output axis, said transverse axis and said swing axis.

8. An independent wheel suspension system for a vehicle having a power delivery unit for translating torque from an engine through a differential to a vehicle driving wheel in contact with a driving surface, said independent wheel suspension system comprising:

transverse support means mounted to said vehicle so as to permit movement of said transverse support means relative to said vehicle, said transverse support means having a first axis of rotation;

a second axis of rotation spaced in a predetermined position relative to said first axis of rotation for cooperation therewith; and means for fixedly mounting said differential to said transverse support means and about said second axis of rotation such that said differential pivots about said first axis of rotation and said second axis of rotation when said vehicle is displaced relative to said driving surface.

9. An independent wheel suspension system for a vehicle having a power delivery unit for translating torque from an engine through a differential to a vehicle driving wheel in contact with a driving surface, said independent wheel suspension system comprising:

transverse support means mounted to said vehicle so as to perimit movement of said transverse support means relative to said vehicle, said transverse support means having a first axis of rotation, said first axis of rotation extending transversely of said vehicle;

a second axis of rotation spaced in a predetermined position relative to said first axis of rotation for cooperation therewith, said second axis of rotation extending transversely of said vehicle; and means for fixedly mounting said differential to said transverse support means and about said second axis of rotation such that said differential pivots about said first axis of rotation and said second axis of rotation when said vehicle is displaced relative to said driving surface.

10. An independent wheel suspension system for a vehicle having a power delivery unit for translating torque from an engine through a differential to a vehicle driving wheel in contact with a driving surface, said independent wheel suspension system comprising:

transverse support means mounted to said vehicle so as to permit movement of said transverse support means relative to said vehicle, said transverse support means having a first axis of rotation, said first axis of rotation extending transversly of said vehicle;

a second axis of rotation spaced in a predetermined position relative to said first axis of rotation for cooperation therewith, said second axis of rotation extending longitudinally of said vehicle; and means for fixedly mounting said differential to said transverse support means and about said second axis of rotation such that said differential pivots about said first axis of rotation and said second axis of rotation when said vehicle is displaced relative to said driving surface.

* * * * *

UNITED STATES PATENT AND TRADEMARK OFFICE
CERTIFICATE OF CORRECTION

PATENT NO. : 4,669,571
DATED : June 2, 1987
INVENTOR(S) : Werner Krude

It is certified that error appears in the above-identified patent and that said Letters Patent is hereby corrected as shown below:

On the Title Page, Items [19] and [75]

Kindly correct the name of the inventor, delete "Kurde" and insert ---

Krude ----.

In The Specifications

Column 3, line 17, delete "Cardan type" and insert ---- Cardan-type ----.

Column 3, line 21, delete "Cardan type" and insert ---- Cardan-type ----.

Column 3, line 31, delete "Cardan type" and insert ---- Cardan-type ----.

Column 6, line 55, after "therefore" insert a comma ---- , ----.

Column 11, line 67, delete "porp" and insert ---- prop ----.

Column 12, line 21, delete "defing" and insert ---- defining ----.

Signed and Sealed this

Third Day of November, 1987

Attest:

DONALD J. QUIGG

*Attesting Officer*  *Commissioner of Patents and Trademarks*